J. N. Matlock.
Seed Sower.
Nº 86,563.  Patented Feb. 2, 1869.
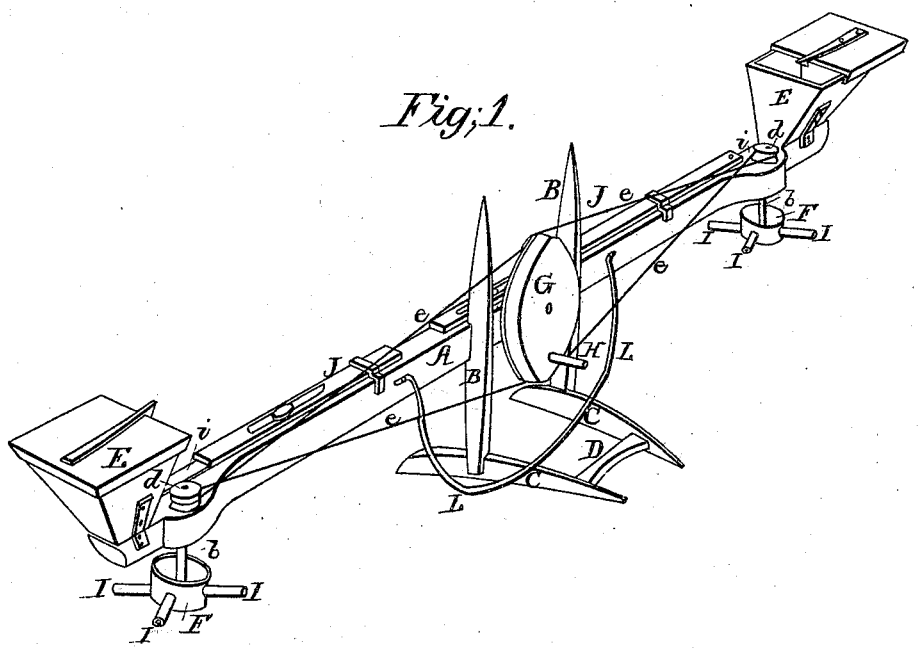
Witnesses:
Harry King.
Leopold Everh
Inventor;
Jasper N. Matlock
per Alexander & Mason
Attys.

JASPER N. MATLOCK, OF AUGUSTA, ASSIGNOR TO HIMSELF, WILLIAM BLAIR, AND EDWARD D. INGERSOLL, OF DES MOINES, IOWA.

Letters Patent No. 86,563, dated February 2, 1869.

IMPROVEMENT IN HAND SEED-SOWERS.

The Schedule referred to in these Letters Patent and making part of the same.

*To all whom it may concern:*

Be it known that I, JASPER N. MATLOCK, of Augusta, in the county of Des Moines, and in the State of Iowa, have invented certain new and useful Improvements in Hand Seed-Sowers; and do hereby declare that the following is a full, clear, and exact description thereof, reference being had to the accompanying drawings, and to the letters of reference marked thereon.

The nature of my invention consists in the construction and general arrangement of a "hand seed-sower," by which the amount of seed sown can be easily regulated, and which is simple, cheap, and durable, and not liable to get out of order.

In order to enable others skilled in the art to which my invention appertains, to make and use the same, I will now proceed to describe its construction and operation, referring to the annexed drawings, which form a part of this specification, and in which—

Figure 1 is a perspective view, and

Figure 2, a plan view of one end, showing the channel through which the seed passes.

A represents a beam or bar, of suitable length, which is supported on two standards, B B, which extend above and below said bar.

At the lower ends of the standards B B are two arms, C C, which are connected near one end by a cross-bar, D, forming a frame, in which the body of the operator should fit, the ends of the two arms C C being at such a distance apart that they will rest on the hips of the operator.

At the ends of the bar A are placed the seed-boxes E E, which are provided with an opening near the inner corner of their bottoms, through which the seed passes downward into a channel, a, cut through the bar A.

The seed, passing through this channel a, falls down into a circular box, or wheel, F, which is suspended from the bar A by means of a shaft, b, secured to the centre of said box F, and, passing up through the bar, is, at its upper end, provided with a pulley, d, which holds the shaft and box in position.

After the seed has passed into this box or wheel F, it is thrown out through the tubes I I by the revolving of said wheel.

The tubes I I radiate from the lower edge of the box or wheel F, and are placed at equal distances apart.

The boxes F F are revolved by means of cords or bands, e e, which pass around the pulleys d d, and around a wheel, G, pivoted to the side of the bar A toward the operator, and turned by a crank, H.

The discharge of seed from the seed-boxes E E is regulated by means of slides, J J, on the upper side of the bar A, the ends of said slides being provided with a metal bar, i, which passes into the seed-box directly over the opening leading into the channel a.

These bars i i being provided with a number of holes of different size, it will be seen that by placing a larger or smaller hole in said bar over the opening mentioned, more or less seed will pass out, whichever may be desired. And the discharge of seed may be entirely cut off by so placing the slide J that the opening in the bottom of the seed-box is closed.

I also secure a strap, L, to the side of the bar A which is toward the operator, which strap will be placed over the head of the operator. It will thus be seen that the machine is supported by this strap and by the ends of the arms C C.

Having thus fully described my invention,

What I claim as new, and desire to secure by Letters Patent, is—

1. The arrangement of the bar A, standards B B, arms C C, cross-bar D, and strap L, all substantially as and for the purposes herein set forth.

2. The combination of the bar A with channels a a, seed-boxes E E, slides J J, and perforated metal bars i i, all arranged and operating substantially as and for the purposes herein set forth.

3. The circular box or wheel F, provided with tubes I I, and suspended, by means of the shaft b and pulley d, from the bar A, in such a position that the seed from the seed-box E, passing through the channel a, will fall into said box, and be thrown out, substantially as herein set forth.

4. The arrangement of the bar A, wheel G, with its crank H, cords e e, and pulleys d d, for the purpose of imparting a rapid rotary motion to the wheels F F, substantially as herein set forth.

In testimony that I claim the foregoing, I have hereunto set my hand, this 14th day of September, 1868.

JASPER N. MATLOCK.

Witnesses:
N. D. TAYLOR,
R. H. HEATH.